UNITED STATES PATENT OFFICE.

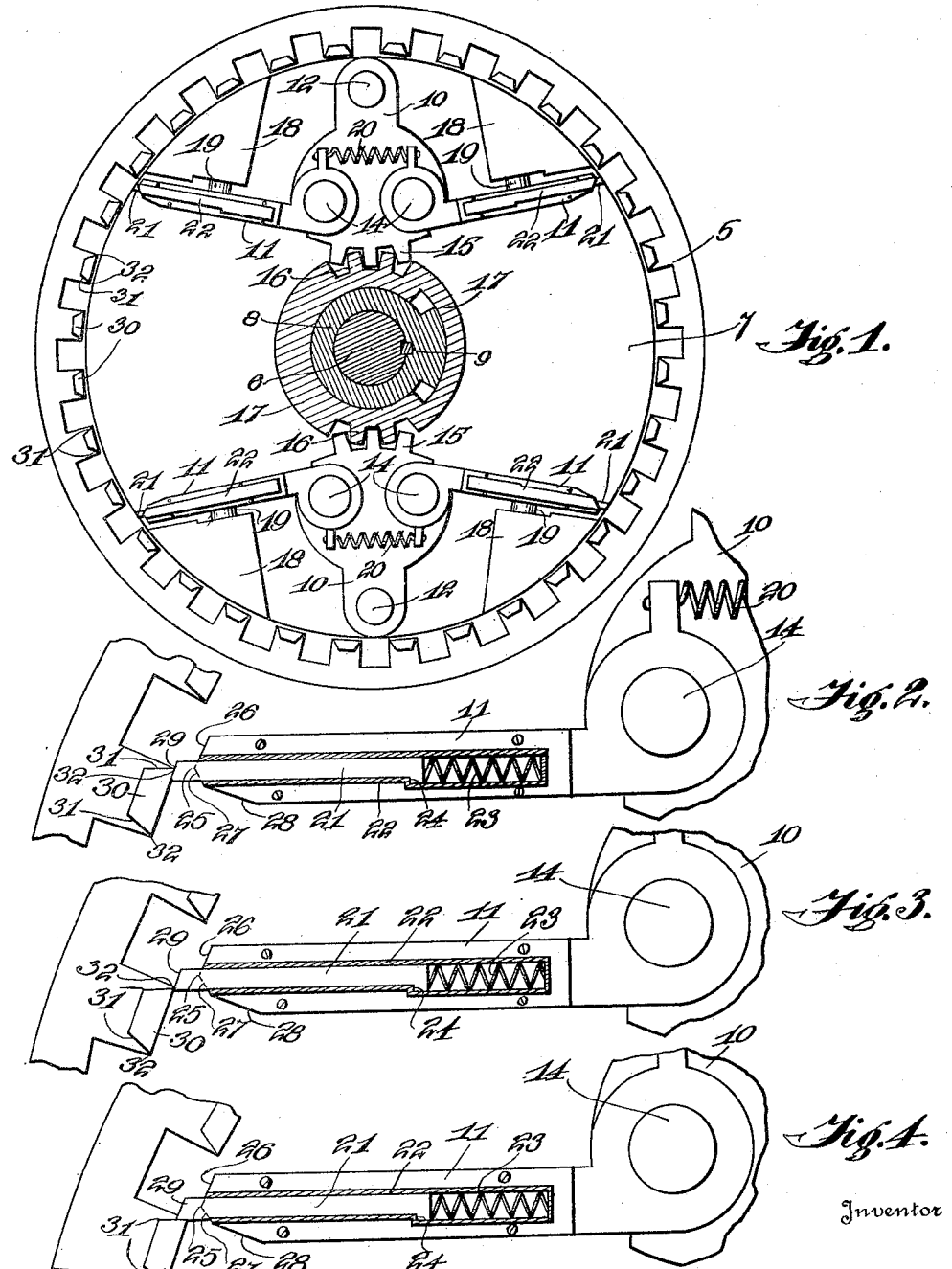

PETER G. LEDEBOER, OF CHICAGO, ILLINOIS.

PAWL-AND-RATCHET MECHANISM.

1,110,802.  Specification of Letters Patent.  Patented Sept. 15, 1914.

Application filed December 16, 1913.  Serial No. 807,024.

*To all whom it may concern:*

Be it known that I, PETER G. LEDEBOER, a citizen of the United States, residing at Chicago, in the county of Cook and State of Illinois, have invented certain new and useful Improvements in Pawl-and-Ratchet Mechanism, of which the following is a specification.

This invention relates to improvements in the driving mechanism disclosed in my Patent No. 1030097, dated June 18, 1912, the same comprising a ratchet ring connected to the wheel or other member to be driven, and a pivoted member carrying pawls which are adapted to engage the teeth of the ring to couple the same to the driving member.

The present invention has for its object to provide the pawl-and-ratchet mechanism with a means whereby the pawls are prevented from striking the edge of the ratchet-teeth, thereby preventing the pawls from getting stuck or jammed. This object is obtained by means of the structure to be hereinafter described and claimed, reference being had to the accompanying drawing, in which—

Figure 1 is an elevation of the mechanism, and Figs. 2 to 4 are diagrams illustrating the operation of the same.

Although the invention is shown applied to the driving mechanism disclosed in the Patent No. 1030097 hereinbefore referred to, it is to be understood that the invention is not limited thereto but may, with equal facility, be applied to various other kinds of pawl-and-ratchet devices.

Referring now specifically to the drawing, 5 denotes a ratchet ring which is made fast to the part to be driven, the teeth of the ring being on its inner periphery. On a shaft 6 is mounted a disk 7 having a hub 8 which is made fast on the shaft by a key or other suitable means 9. The ring 5 encircles the disk 7, and on diametrically opposite sides of the shaft 6, said disk carries supporting members 10 for pawls 11, said members being pivoted, as indicated at 12. The pawls are pivoted at 14 to the members 10. The pawls of the respective supporting members extend in opposite directions, and are adapted to engage the teeth of the ring 5 when said members are swung sidewise. The members 10 have a toothed edge 15 meshing with teeth 16 on the hub 17 of a driving member.

In operation, when the driving member is set in motion, its hub 17 will rock the members 10 to engage one set of pawls 11 with the teeth of the ring 5, thus coupling the ring to the driving member.

The structure thus far described is in all respects the same as that shown in the patent referred to.

On the disk 7, behind each pawl 11, is a stop lug 18 carrying a spring-pressed plunger 19 which engages the pawl, and the inner ends of each pair of pawls are connected by a coiled spring 20 which tends to swing the pawls against the plungers 19.

In operation, the pawls 11 are apt to stick or become jammed by striking one edge of a tooth on the ring 5, and in order to prevent this, each pawl carries an auxiliary pawl 21 which latter is arranged and operates as follows: The pawl 11 has a longitudinal housing 22 containing the auxiliary pawl 21, the latter being slidably mounted in the housing and held normally projected from the tip of the pawl 11 by a spring 23 seating in the inner end of the housing and pressing against the corresponding end of said pawl 21. The outward movement of the pawl 21 is limited by a shoulder 24. The tip of the pawl 11 is beveled on opposite sides to a point 25, the two beveled portions being indicated at 26 and 27, respectively. From the beveled surface 27 a third beveled surface 28 extends inward. The projecting end of the pawl 21 is located on one side of the pawl 11 alongside the point 25 and slightly in advance thereof, and the tip of said pawl 21 is beveled, as indicated at 29. Each tooth of the ring 5 has a raised portion 30 on one side coinciding with the front edge of the tooth. The ends of the raised portion are beveled, as indicated at 31 and extend convergingly inward from the outer corners 32 of the tooth.

In operation, when the pawl 11 approaches the ratchet ring 5, the auxiliary pawl 21 first strikes a tooth. Now, if the ratchet ring is in such a position that the top edge 32 of the tooth, toward which the pawl 11 is swinging, is directly in line with the edge 25 of said pawl, said edges cannot come together for the reason that the pawl 21 first strikes the tooth, and slides down the same. As the pawl 21 slides, as stated, it carries the pawl 11 downward so that its edge 25 clears the tooth edge 32. The pawl 21 now does not slide back in the housing 22 as the tension of the spring 23 is slightly greater than the tension of the spring 20, and as the movement of the pawls is toward the tooth, and the surface which the pawl 21 engages is an incline, the sliding movement takes place, resulting in a slight swing of the pawl 11 on its pivot 14 to clear the tooth edge 32. As soon as the pawl 11 clears the lower tooth edge 32, it slips into the tooth recess.

If the pawl 21 strikes the top tooth edge 32 and sticks there, it will be disengaged when the beveled surface 27 strikes said edge, whereupon the pawl 11 slips into the tooth recess above the top tooth edge; or if the pawl 21, on account of the pressure behind it, slips off the tooth edge before the surface 27 strikes said edge, it slides along the beveled surface 31, and when the surface 27 strikes the tooth edge, the pawl 11 slips into the tooth recess as before, and the pawl 21 swings upward with the pawl 11, away from the surface 31.

The beveled surface 28 is provided in order that the pawl 11 may fit squarely against the side of the tooth when it seats in the tooth recess.

In the event of the pawl 11 approaching the teeth directly in line with a tooth space, it will enter the same without the pawl 21 being brought into play.

I claim:

1. The combination of a swinging member, a pawl pivoted to said member, a toothed member engageable by the pawl when the first-mentioned member is swung, and an auxiliary pawl carried by the first-mentioned pawl and normally projecting from the tip thereof.

2. The combination of a swinging member, a pawl pivoted to said member, a toothed member engageable by the pawl when the first-mentioned member is swung, and an auxiliary pawl carried by the first-mentioned pawl, the tip of the first-mentioned pawl being beveled to an edge, and the auxiliary pawl being on one side of said edge and projecting in advance thereof.

3. The combination of a swinging member, a pawl pivoted to said member, a toothed member engageable by the pawl when the first-mentioned member is swung, an auxiliary pawl carried by the first-mentioned pawl, the tip of the first-mentioned pawl being beveled to an edge, and the auxiliary pawl being on one side of said edge and projecting in advance thereof, yielding means opposing the swing of the first-mentioned pawl in one direction, and yielding means opposing the rearward movement of the auxiliary pawl, the last-mentioned yielding means having a greater tension than the first-mentioned.

4. The combination of a swinging member, a pawl pivoted to said member, a toothed member engageable by the pawl when the first-mentioned member is swung, an auxiliary pawl carried by the first-mentioned pawl, the tip of the first-mentioned pawl being beveled to an edge, and the auxiliary pawl being on one side of said edge and projecting in advance thereof, the teeth of the aforesaid member having raised portions on one side in the path of the auxiliary pawl, and the ends of said raised portions being beveled to converge inwardly of the tooth.

In testimony whereof I affix my signature in presence of two witnesses.

PETER G. LEDEBOER.

Witnesses:
S. J. LEHRER,
H. G. BATCHELOR.

---

Copies of this patent may be obtained for five cents each, by addressing the "Commissioner of Patents, Washington, D. C."